Inventor:
Neal E. Starkey,
by Ernest C. Britton
His Attorney.

Patented May 5, 1953

2,637,334

UNITED STATES PATENT OFFICE 2,637,334

FLUID PRESSURE SERVO MECHANISM

Neal E. Starkey, Schenectady, N. Y., assignor to General Electric Company, a corporation of New York Application August 26, 1950, Serial No. 181,651

7 Claims. (Cl. 137—85)

This invention relates to fluid fuel regulating systems, particularly to a system for supplying two different types of fluid fuels to a thermal powerplant such as a gas turbine.

When a gas turbine powerplant is installed in a locality where natural gas is available, it is usually most economical to arrange the powerplant to use such fuel to the maximum extent practicable. However, the availability of natural gas fuel varies from summer to winter, since in the winter the consumption of gas for heating purposes is greatly increased. Accordingly, it becomes necessary to provide the powerplant with a dual fuel system capable of supplying either all natural gas, or all some alternate fuel, or part of each. It is of course desirable that the change from one fuel to the other, or variation in the proportions in which the two fuels are supplied, be readily effected.

Accordingly, an object of the invention is to provide a dual fuel regulator for controlling the supply to a heat generator of gaseous fuel and a suitable liquid fuel oil, such as that sold commercially as diesel fuel or the heavier residual oil known as "Bunker C." A further object is to provide a dual fuel regulator of the type described in which the two fuels are supplied continuously in a fixed ratio, regardless of wide variations in the combined rate of supply. Another object is to provide a dual fuel regulator in which the ratio of one fuel to the other may be readily altered during operation, without even shutting down the powerplant.

Figure 1:
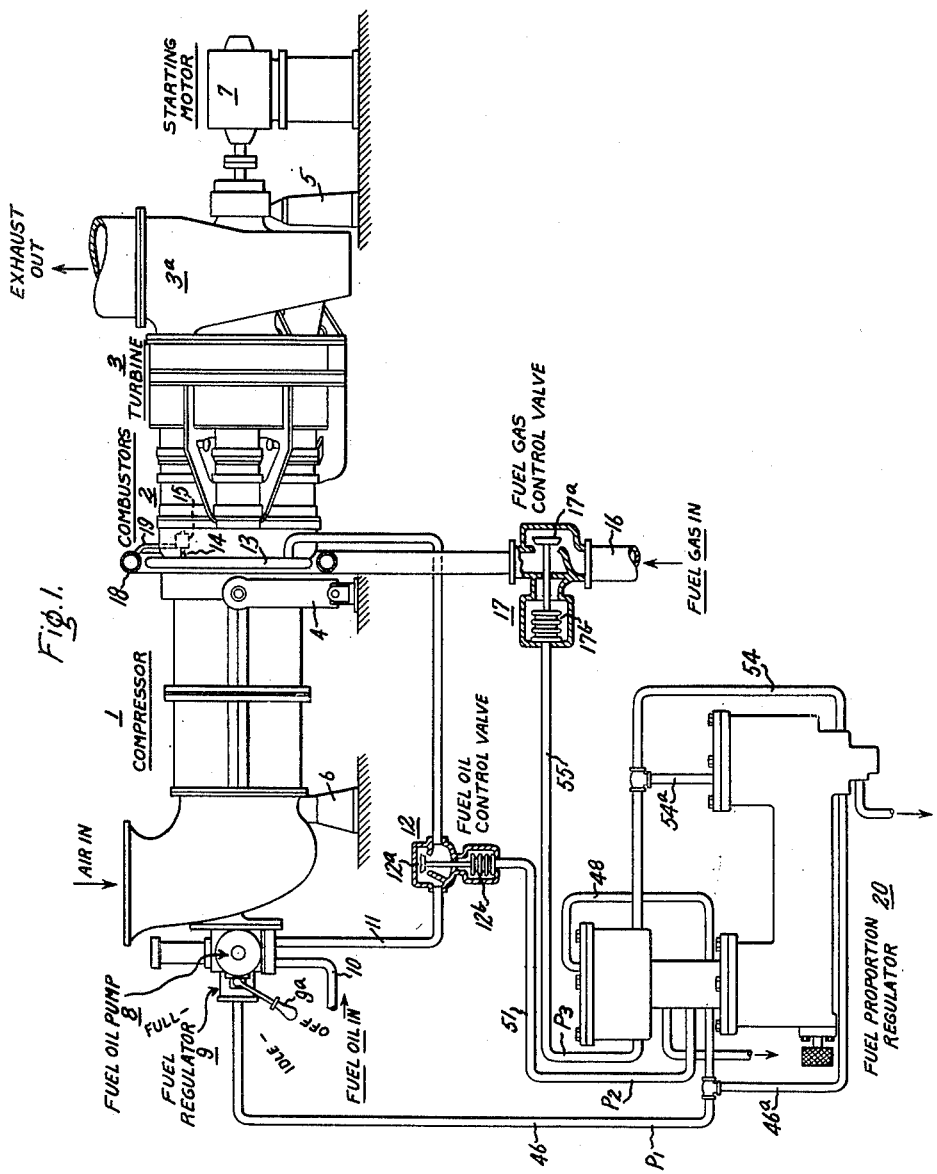
Figure 2:
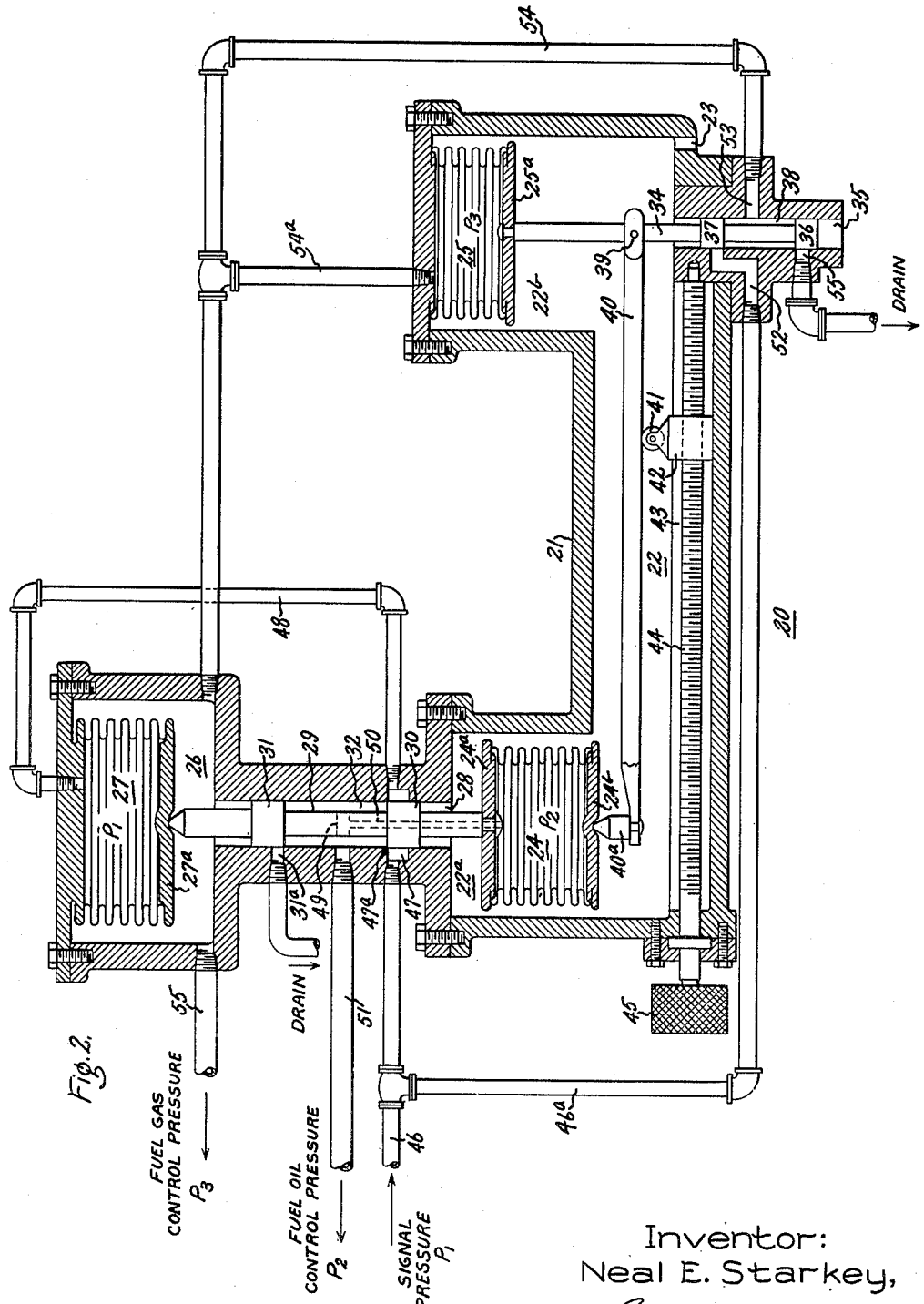

Other objects and advantages will become apparent from the following description taken in connection with the accompanying drawings, in which Fig. 1 is a diagrammatic representation of a gas turbine powerplant having a dual fuel system in accordance with the invention, and Fig. 2 is a more detailed view, in section, of the fuel proportioning regulator itself.

Generally, the fuel proportioning regulator which constitutes the essence of this invention is a hydraulic-mechanical servo-mechanism arranged to receive an input signal pressure and to produce two output signal pressures, the arithmetic sum of the output pressures being proportional to the input signal pressure and the ratio of the output pressures to each other being adjustable. The input signal pressure is derived from a fuel regulator, which is not a part of the present invention, and the two output signal pressures are employed to control suitable valves in the respective fuel supply conduits to a combustion system.

Referring now more particularly to Fig. 1, the fuel system is shown as applied to a gas turbine powerplant of the simple "open-cycle" type, comprising an axial flow compressor indicated generally at 1, a combustion system comprising a plurality of cylindrical combustors spaced circumferentially around the axis of the powerplant and indicated generally at 2, and an axial flow turbine the exterior casing of which is indicated at 3. The compressor 1 takes air from the surrounding atmosphere through an intake casing 1a and discharges directly into the combustors, from which hot motive fluid enters the turbine 3 and leaves through an exhaust casing 3a. The precise structural details of the gas turbine are not material to an understanding of the present invention, but it may be noted that the powerplant shown is as disclosed in the copending application of Alan Howard, Chester S. Rice, and Bruce O. Buckland, Serial No. 754,002, filed June 11, 1947, and assigned to the same assignee as the present application. This powerplant is a self-contained assembly, capable of being supported at its mid-portion by a pair of transversely spaced vertically extending links 4 pivoted at their lower ends to the foundation of the machine, a third point of support being furnished by a fixed pedestal 5. With this three-point support, the rather heavy compressor casing is in overhung relation to the supporting means, and an auxiliary support shown at 6 may be employed, principally to dampen vibration of the overhung compressor.

The powerplant auxiliaries comprise a suitable starting motor indicated in Fig. 1 as being an electric motor 7 coupled to the exhaust end of the turbine-compressor rotor. At the inlet end of the compressor are grouped a number of auxiliaries including a suitable pump 8 for delivering the liquid fuel at a suitable pressure, and a fuel regulator 9 adapted to provide the control signal pressure for determining the total amount of fuel to be supplied to the combustion system.

The details of the regulator 9 are not material to an understanding of the present invention, but it is a hydraulic-mechanical servo-mechanism resposive to numerous operating characteristics of the powerplant, such as speed, motive fluid temperature, ambient atmospheric temperature and pressure, and the position of a control member which is set, either automatically or manually, to select the rate of fuel supply desired. This last-mentioned control member is indicated in Fig. 1 as being a manual throttle lever 9a having "off," "idle," and "full load" positions. Regulators of this general type are disclosed in the copending application of Edwards, Garr, and Ogle, Serial No. 605,960, filed July 19, 1945, also the Ogle, Garr, and Edwards application Serial No. 697,058, filed September 14, 1946, and the application of Starkey, Lewis, and Edwards, Serial No. 84,416, filed March 30, 1949. These regulators comprise means for integrating a rather large number of input signals and producing in accordance therewith a hydraulic output signal pressure which is a function of the rate of fuel supply desired. This signal pressure is represented by the symbol $P_1$ hereinafter.

The liquid fuel oil is drawn by pump 8 from a reservoir (not shown) through an inlet conduit 10 and discharged through conduit 11 containing a fuel oil throttling valve 12. Conduit 11 connects with an annular manifold 13 provided with a plurality of branch conduits, only one is shown at 14 communicating with a suitable fuel spray nozzle, indicated in dotted lines at 15. It will be appreciated that similar branch lines communicate with the respective nozzles in each of the combustors. The fuel nozzles may be of any suitable type, but are preferably a single nozzle assembly having passages for receiving both the liquid and gaseous fuels and discharging them through a plurality of orifices so as to produce a desired spray pattern in the combustion space. Such dual fuel nozzles are known in the art, and the mechanical details thereof are not material to an understanding of the present invention. The natural gas or other gaseous fuel is received through a conduit 16 containing a flow controlling valve 17 and communicating with an annular manifold 18 having branch conduits 19 supplying the respective fuel nozzles 15.

It will be appreciated from a consideration of Fig. 1 that the fuel oil control valve 12 comprises a flow control disc member 12a positioned by an expansible bellows 12b, the arrangement being such that the valve opens progressively as the control pressure within the bellows 12b increases. Thus the rate of supply of fuel oil to the manifold 13 is regulated by valve 12 in accordance with the control pressure $P_2$ communicated to the bellows 12b. Likewise, the gas regulating valve 17 comprises a flow control disc member 17a positioned by a bellows 17b, the rate of supply of fuel gas increasing as a function of the second control pressure $P_3$ communicated to the bellows 17b.

The fuel proportioning regulator is indicated generally at 20 in Fig. 1, the details being shown more clearly in the sectional view of Fig. 2. This regulator comprises a housing 21 defining a chamber 22 vented to the atmosphere through a drain port 23. Chamber 22 has two transversely spaced portions 22a and 22b, the first containing a first pressure responsive bellows 24 and the other containing a second bellows 25. Housing 21 also defines a separate chamber 26 containing a third bellows 27.

Extending between the chambers 22a and 26 is a pilot valve bore 28 containing a longitudinally slidable main pilot spindle 29. This has a pair of axially spaced discs or lands 30, 31 defining between them an annular space 32. As will be seen in Fig. 2, the upper end of spindle 29 engages the movable end abutment 27a of the flexible bellows 27. The lower end of pilot spindle 29 is fixed, as by riveting, to the upper end abutment 24a of the flexible bellows 24. The upper land 31 of the main pilot spindle 29 is arranged to cooperate with a drain port 31a, the port being opened as the land rises.

A secondary pilot valve includes a spindle 34 longitudinaly slidable in a bore 35 in housing 21 and having a pair of spaced lands 36, 37 defining an annular space 38 therebetween. At its upper end, spindle 34 is riveted to the end disc 25a of flexible bellows 25, and is connected by a pivot 39 at its mid-portion to a proportioning lever 40. The mid-portion of lever 40 is supported by an adjustable fulcrum in the form of a roller member 41 carried on an abutment 42 which may be positioned longitudinally in a groove 43 formed in the bottom wall of housing 21. This axial positioning is effected by a lead-screw 44 carrying an adjusting thumb screw 45 exterior of housing 21. It will be apparent that rotation of the adjusting screw 45 will turn the lead-screw 44 and cause the abutment 42 to move axially so that the fulcrum 41 may be positioned directly adjacent the auxiliary pilot spindle 34, or adjacent the main pilot spindle 29, or in any intermediate position. At its left-hand end, lever 40 carries an abutment 40a engaging the lower end disc 24b of bellows 24.

The hydraulic circuit in the proportioning regulator 20 is as follows. The signal pressure $P_1$ furnished by the fuel regulator 9 is communicated through conduit 46 to an annular chamber 47. This signal pressure from conduit 46 is communicated directly from the chamber 47 to the interior of the first bellows 27 by means of conduit 48. It will be apparent that as the main pilot spindle 29 is displaced downwardly, the land 30 defines an annular orifice with the cut-off edge 47a for admitting oil under pressure into the annular chamber 32. This chamber is in communication with the interior of the second bellows 24 by way of a transverse drilled hole 49 communicating with a longitudinal drilled hole 50. Thus bellows 24 is charged with operating liquid at a variable pressure $P_2$ in accordance with the position of pilot spindle 29, this pressure being communicated by way of conduit 51 with the bellows 12b of the fuel oil control valve 12.

Oil under pressure from the conduit 46 is also supplied through a branch conduit 46a to a passage 52 in housing 21, which passage is adapted to be blocked by the upper auxiliary pilot valve land 37. It will be apparent that upward movement of pilot spindle 34 effects flow of liquid under pressure from the passage 52 into the annular space 38, thence through port 53 and conduit 54 to the space 26 surrounding the flexible bellows 27 and through conduit 54a to bellows 25. It will also be seen in Fig. 2 that the lower land 36 of the auxiliary pilot 34 cooperates with drain port 55 so that the drain port is uncovered when the land 36 descends. The pressure existing within the chamber 26 is the fuel gas control pressure, and is communicated by conduit 55 to the expansible bellows 17b of the fuel gas control valve.

The method of operation of the fuel proportioning regulator is as follows. In the inoperative or "steady-state" condition, illustrated in Fig. 2, the main pilot valve disc 30 just blocks the inlet port 47 and the upper land 31 blocks the drain port 31a. Likewise, the auxiliary pilot valve disc 37 just blocks the inlet passage 52, and the lower disc 36 blocks the drain passage 55. If now the powerplant begins operation, the fuel regulator 9 will begin supplying a positive control signal pressure $P_1$ to the conduit 46.

This signal pressure is communicated directly, by way of the generously proportioned annular space 47 and conduit 48 to the signal pressure bellows 27. The resulting force on the bellows end disc 27a forces the spindle 29 downwardly. This produces an annular orifice between the disc 30 and the annular cut-off edge 47a, through which pressure liquid flows into the space 32, thence through passages 49, 50 into the bellows 24 so as to establish the fuel oil control pressure $P_2$ therein, and in the fuel oil control valve bellows 12b.

The downward movement of spindle 29, in combination with the pressure $P_2$ in bellows 24, causes the pressure proportioning lever 40 to pivot counterclockwise about the fulcrum 41. This causes the auxiliary spindle 34 to rise, establishing communication between the inlet passage 52 with the annular space 38 and conduit 54, so that the fuel gas control pressure $P_3$ is established in the space 26 acting on the exterior of the bellows 27 and in the third bellows 25. The pressure $P_3$ acting on the lower surface of end disc 27a tends to move it upwardly against the signal pressure $P_1$. Likewise, the fuel gas control pressure $P_3$ acting in bellows 25 tends to move spindle 34 downwardly. It will be seen that both of these effects tend to restore the proportioning lever 40 to an equilibrium position.

In the equilibrium condition, it will be observed that the forces acting on the main pilot spindle 29 result from the signal pressure $P_1$ acting downwardly on the bellows end disc 27a, the gas control pressure $P_3$ acting upwardly on the end disc 27a, and the oil control pressure $P_2$ acting upwardly on the upper end disc 24a of bellows 24. Thus, assuming that bellows 24 and 27 are of equal effective area, spindle 29 will be in an equilibrium position when the signal pressure $P_1$ is the arithmetic sum of the fuel gas control pressure $P_3$ and the fuel oil control pressure $P_2$. If there is no leakage in the system, this equilibrium position will be reached with the disc 30 just aligned with the annular cut-off edge 47a. If there should be some small leakage somewhere in the system, the equilibrium position will be reached with a small orifice defined between disc 30 and edge 47a, the orifice being of a size just sufficient to supply the leakage so that the pressures $P_1$, $P_2$, and $P_3$ have the relation specified.

In order for the proportioning lever 40 to be in an equilibrium condition, it is necessary that the oil control pressure $P_2$ in bellows 24, times the effective area of bellows 24, times the moment arm between abutment 40a and fulcrum 41 shall equal the gas control pressure $P_3$, times the effective area of bellows 25, times the moment arm from the pivot 39 to the fulcrum 41. Thus if it is again assumed that bellows 24 and 25 are of equal effective areas, the pressure $P_2$ times its moment arm must equal the pressure $P_3$ times its moment arm. In other words, the ratio of the fuel gas control pressure to the fuel oil control pressure must be a constant, as determined by the position of the variable fulcrum 41.

It will be apparent to those skilled in the hydraulic regulator art that deviations from these equilibrium conditions will produce the following changes. When the control signal pressure $P_1$ increases, the bellows 27 extends so as to move spindle 29 downwardly still further to increase the pressure $P_2$ in bellows 24. This results in further counterclockwise rotation of the balancing lever 40, so that the auxiliary spindle 34 rises and increases the pressure $P_3$ supplied to bellows 25 and the chamber 26. These pressure increases effect the restoring action described above so that a new equilibrium condition is reached. Conversely when control signal $P_1$ decreases, bellows 27 contracts somewhat so that spindle 29 rises, the upper land 31 opens the drain port 31a, with the result that liquid drains from bellows 24 through the passages 50, 49, 32, 31a. The resulting decrease in pressure $P_2$ permits the balancing lever 40 to rotate slightly in the clockwise direction so that spindle 34 descends to open port 55 and drain some liquid from the space 26 and bellows 25. This reduced pressure in 25 and 26 causes the auxiliary spindle 34 to rise until the drain port 55 is again blocked. Meanwhile the main spindle 29 descends slightly so that the drain port 31a is blocked.

Similarly, if the fuel gas control pressure $P_3$ should suddenly decrease for some reason, bellows 25 will collapse so that spindle 34 rises to admit more liquid from passage 52 until the pressure $P_3$ is restored to the value required to balance pressure $P_2$ acting on the other end of lever 40. The same action will take place of course if the fuel oil control pressure $P_2$ should suddenly increase.

It will now be apparent that the bellows 24, 27 act on the main pilot spindle 29 under the influence of all three pressures $P_1$, $P_2$, $P_3$ to insure that the sum of pressures $P_2$, $P_3$ will always equal the signal pressure $P_1$. This means that the combined supply of fuel from the two sources will vary in direct relation to the input signal pressure received from the fuel regulator 9. Similarly, the two fuel control pressures $P_2$, $P_3$ acting on the proportioning lever 40 insure that the two fuels will always be maintained at a preselected ratio to each other, as determined by the position of fulcrum 41.

When fuel gas is cheap and plentiful, as may be the case in summer-time in a gas-producing area, the variable fulcrum 41 is positioned to the right by turning the thumbscrew 45 until the fuel oil control pressure $P_2$ is insufficient to effect opening of the fuel oil control valve disc 12a against the inlet pressure of the fuel oil supplied by pump 8. The result is that valve 12 will remain in closed position and the fuel gas control pressure $P_3$ will position the control valve 17.

It will be understood, of course, that both the mechanical characteristics of the fuel control valves 12 and 17, as well as the fuel inlet pressures applied to the respective valve discs 12a, 17a will determine some minimum pressure which will be required in the actuating bellows 12b, 17b before the respective fuel control valves will open. Thus when it is desired to operate entirely on one fuel or the other, it is only necessary to adjust the proportioning regulator 20 so that the proper control pressure, $P_2$ or $P_3$ as the case may be, is below the minimum value required to open that fuel control valve. It will be apparent from the above discussion that moving the adjustable fulcrum 41 toward the right will decrease the amount of fuel oil supplied to the powerplant until it may become zero, operation being then entirely on fuel gas. Moving fulcrum 41 to the left will make the fuel gas pressure decrease to zero, with operation entirely on oil. Thus in summer when fuel gas is plentiful, operation may be entirely on that fuel, whereas in winter when the gas is required for other purposes, operation may be entirely on diesel fuel or Bunker C oil. In most cases however it will be found economical in gas-producing regions to burn as large a proportion of fuel gas as the supply will allow, making up the balance of the fuel requirements from the more expensive fuel oil.

It will be apparent to those skilled in the art that many modifications of the structure shown in the drawings may be made. For instance, while the analysis of the operation has been described as if all three bellows 24, 25, 27 were of equal effective area, it may be desirable in some cases to make these bellows of slightly different areas in order to obtain special operating characteristics as may be determined by analysis of the conditions in a particular powerplant.

Also, it may be noted that, whereas the control signal pressure $P_1$ furnishes both the input pressure signal through conduit 48 to bellows 27, and also the operating liquid for charging bellows 24, 25 to establish the control pressures $P_2$, $P_3$, it is possible to supply the signal pressure $P_1$ directly to bellows 27, and use a motive liquid from another independent source to supply conduit 46 for establishing the control pressures $P_2$ and $P_3$. However, the arrangement shown in Fig. 2 is advantageous since the single supply of hydraulic liquid from the fuel regulator 9 furnishes both the pressure signal and the motive fluid for establishing the control pressures.

It will also be obvious that many changes may be made in the specific mechanical details of the fuel proportioning regulator. Pressure responsive pistons or diaphragms might be used in place of one or more of the flexible bellows shown. Also the adjusting mechanism for varying the effective moment arms of the pressures $P_2$, $P_3$ on the balancing lever 40 might take many forms. The arrangement of the respective housings for the bellows and pilot valves is not material to the present invention and could obviously take many other shapes.

While the invention has been described as a regulator for supplying one gas and one liquid fuel to a gas turbine powerplant, it is obviously useful to supply two gaseous or two liquid fuels, and in other heat generators such as steam boilers or house heating systems.

Many other modifications will be apparent to those skilled in the art and it is desired to cover by the appended claims all such changes as fall within the true spirit and scope of the invention.

What I claim as new and desire to secure by Letters Patent of the United States is:

1. Hydraulic servo mechanism comprising a main pilot valve with a first movable member, first expansible chamber means adapted to exert a force on said member proportional to a first pressure, second expansible chamber means adapted to exert a force on said member in opposition to said first means proportional to a second pressure, the main pilot member being adapted to control the flow of operating liquid to the second expansible chamber means to establish said second pressure therein, auxiliary pilot means having a second movable member, third expansible chamber means adapted to exert a force on said second movable member proportional to a third pressure, the auxiliary pilot member being adapted to control the flow of operating liquid to the third expansible chamber means to establish said third pressure therein, means for communicating the third pressure to the first expansible chamber means in opposition to the first pressure, and lever means connecting said second movable member with said second expansible chamber means, whereby the main pilot member is positioned by the sum of the second and third pressures acting in opposition to the first pressure, and the second and third pressures are maintained in a preselected ratio to each other.

2. Hydraulic servo mechanism in accordance with claim 1 and including adjustable fulcrum means for the proportioning lever, whereby the constant ratio maintained between the second and third pressures may be varied.

3. Fluid pressure servo mechanism including a first longitudinally slidable pilot valve member, first expansible chamber means with a movable member adapted to exert a force on said pilot valve member proportional to a signal pressure communicated to the first expansible chamber, second expansible chamber means having first and second movable end members the first of which is adapted to exert a force on said pilot valve in opposition to said signal pressure and proportional to a first control pressure, said first pilot valve having a portion adapted to control the flow of operating fluid to the second expansible chamber means to establish said first control pressure therein, a second longitudinally slidable pilot valve member, third expansible chamber means having a movable end member adapted to exert a force on the second pilot valve member proportional to a second control pressure, said auxiliary pilot valve having a portion adapted to control the flow of operating fluid to the third expansible chamber means to establish said second control pressure therein, conduit means for communicating said second control pressure to the movable member of the first expansible chamber means in opposition to the signal pressure on said member, and lever means engaging a fulcrum and having spaced portions connected to the auxiliary pilot valve member and to the second movable end member of the second expansible chamber means, whereby the first pilot valve is positioned in accordance with the sum of the first and second control pressures acting in opposition to said signal pressure and the control pressures are maintained in a preselected ratio to each other.

4. Fluid pressure servo mechanism comprising first pilot means including a first longitudinally slidable flow control member, first expansible chamber means including a movable abutment adapted to exert a force on said first flow control member in accordance with a signal pressure applied to one side of the abutment, second expansible chamber means having first and second movable end abutment members one of which is adapted to exert a force on the first flow control member in opposition to said signal pressure and in accordance with a first control pressure supplied to the second expansible chamber, the first flow control member having a portion adapted to control the flow of operating fluid to the second expansible chamber to establish said first control pressure therein, second pilot means including a second longitudinally slidable pilot valve member, third expansible chamber means having a movable end member connected to exert a force on the second flow control member in accordance with a second control pressure, the second pilot having a portion adapted to control the flow of operating fluid to the third expansible chamber means to establish said second control pressure therein, and conduit means communicating the second control pressure to the first expansible chamber means to exert a force on the first movable abutment member in opposition to said signal pressure, and lever means engaging a fulcrum and having spaced portions connected to the auxiliary pilot valve member and the second abutment member of the second expansible chamber whereby the signal pressure and first and second control pressures position the first pilot member as a function of the sum of the control pressures opposing the signal pressure while the control pressures are maintained by the auxiliary pilot at a preselected constant ratio to each other.

5. Fluid pressure servo mechanism in accordance with claim 4 and including adjustable fulcrum means for the ratio control lever whereby the constant ratio maintained between the control pressures may be altered.

6. Fluid pressure servo mechanism comprising first pilot means including a first longitudinally slidable spindle, a first expansible bellows member enclosed in a housing with one end fixed relative thereto, the other end member of the bellows being adapted to exert a force on said first spindle in proportion to a signal pressure supplied to the interior of the bellows, a second bellows having a first movable end member adapted to exert a force on the first spindle in opposition to the signal pressure in the first bellows, said second bellows having also a second movable end member, said first pilot spindle having flow control portions adapted to meter operating fluid to the second bellows to establish a first control pressure therein, second pilot means including a second longitudinally slidable spindle member, a third bellows having one end fixed and a free end member connected to exert a force on the second spindle proportional to a second control pressure supplied to the interior of the third bellows, said second pilot spindle having flow control portions adapted to regulate the supply of operating fluid to the interior of said third bellows to establish the second control pressure therein, conduit means communicating said second control pressure from the third bellows to the housing surrounding the first bellows whereby the second control pressure acts on the movable end of the first bellows in opposition to said signal pressure, the first pilot member being positioned in accordance with the first and second control pressures acting in opposition to the signal pressure, lever means connecting the second pilot spindle with the second movable end member of the second bellows, and fulcrum means engaging an intermediate portion of said lever, whereby the second pilot spindle is positioned to maintain said first and second control pressures at a preselected constant ratio to each other in accordance with the position at which said fulcrum engages the lever.

7. Fluid pressure servo mechanism comprising first pilot means including a first longitudinally slidable spindle member, a first expansible bellows enclosed in a housing with one end fixed and the other end adapted to exert a force on said first spindle in proportion to a signal pressure in the bellows, a second expansible bellows having first and second movable end members the first of which is adapted to exert a force on said first spindle in opposition to said signal pressure, said first spindle defining a flow control portion adapted to regulate the supply of operating fluid to the interior of the second bellows to establish a first control pressure therein, second pilot means including a second longitudinally slidable spindle, a third expansible bellows having one end fixed and a movable end adapted to exert force on said second spindle, said second pilot spindle having a flow control portion adapted to regulate the flow of operating fluid to the third bellows to establish a second control pressure therein, conduit means communicating said second control pressure to the housing surrounding the first bellows whereby said second control pressure acts on the movable end of the first bellows in opposition to the signal pressure, and proportioning lever means engaging a fulcrum and connecting the second pilot spindle with said second movable end of the second bellows, whereby the second pilot is positioned to maintain the second control pressure at a preselected ratio to the first control pressure in accordance with the position of said fulcrum.

NEAL E. STARKEY.

References Cited in the file of this patent

UNITED STATES PATENTS

| Number | Name | Date |
|---|---|---|
| 2,016,824 | Smith | Oct. 8, 1935 |
| 2,196,926 | Larson et al. | Apr. 9, 1940 |
| 2,285,540 | Stein et al. | June 9, 1942 |
| 2,310,979 | Mercer | Feb. 16, 1943 |
| 2,418,163 | Chase | Apr. 1, 1947 |
| 2,451,451 | Tate | Oct. 12, 1948 |